Feb. 8, 1944.　　　　K. K. PALUEV　　　　2,341,058
ELECTRIC APPARATUS WITH FLUID SYSTEM THEREFOR
Filed Nov. 29, 1941　　　5 Sheets-Sheet 1
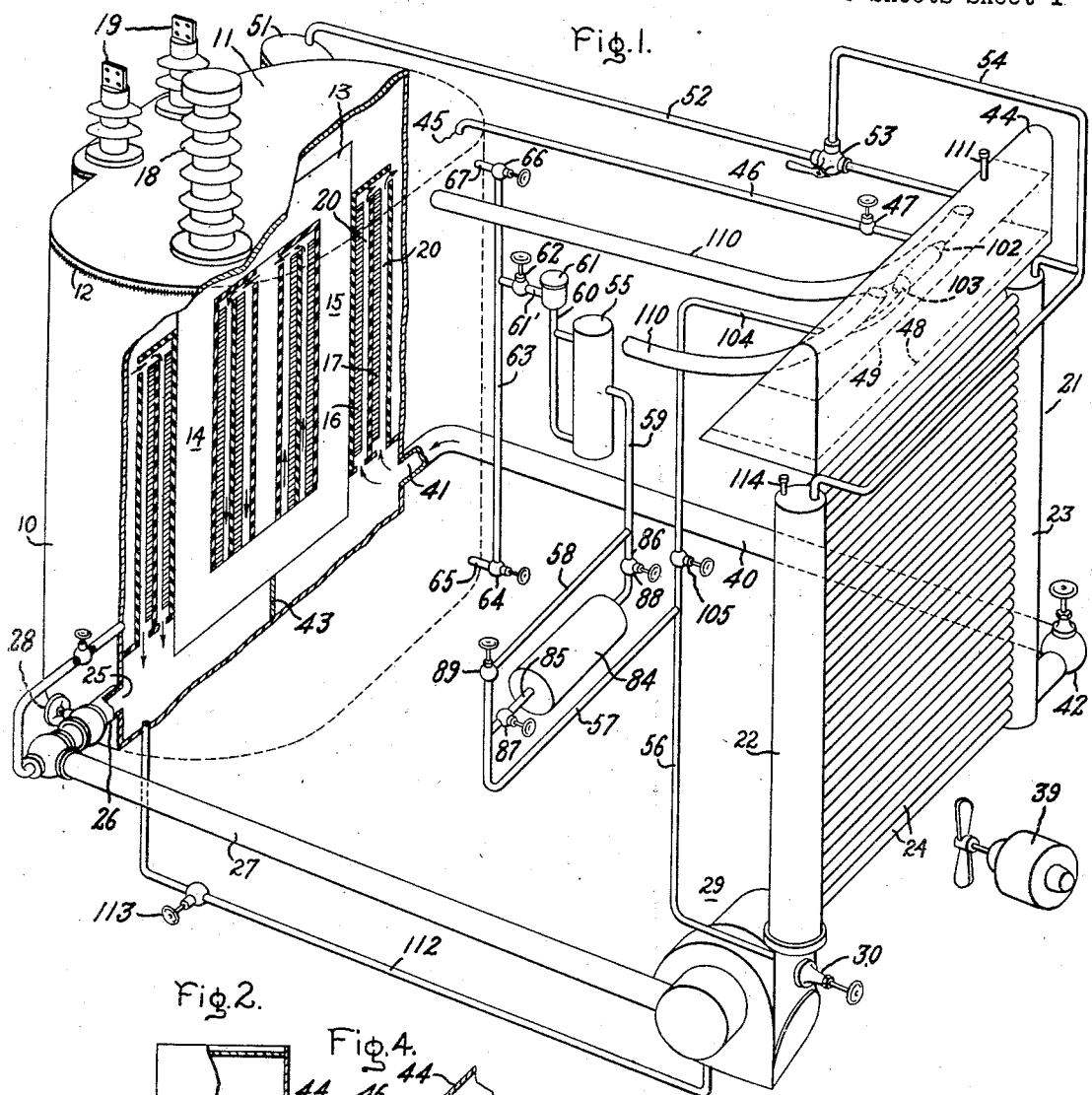
Inventor:
Konstantin K. Paluev,
by Harry E. Dunham
His Attorney.

Inventor:
Konstantin K. Paluev,
by Harry E. Dunham
His Attorney.

Inventor:
Konstantin K. Paluev,
by Harry E. Dunham
His Attorney.

Inventor:
Konstantin K. Paluev,
by Harry E. Dunham
His Attorney.

Patented Feb. 8, 1944

2,341,058

UNITED STATES PATENT OFFICE 2,341,058

ELECTRIC APPARATUS WITH FLUID SYSTEM THEREFOR

Konstantin K. Paluev, Pittsfield, Mass., assignor to General Electric Company, a corporation of New York Application November 29, 1941, Serial No. 420,943

17 Claims. (Cl. 174—14)

My invention relates to electric apparatus and to a fluid system therefor, and although not limited thereto it has application to electric apparatus of the electric induction type, such as transformers which are designed for relatively high voltage and kva. capacity.

An object of my invention is to provide an improved electric apparatus which will be efficient in operation and have a minimum size per unit of capacity.

Another object of my invention is to improve the quality and efficiency of the insulation of electrical apparatus to levels heretofore considered impracticable and to insure the permanency of such improvement whereby the apparatus for a given kilovolt and ampere rating can be greatly reduced in weight, volume and cost. Transformers adapted for relatively high voltage and capacity and having features of my invention, I have found show substantial and unexpected improvements in electrical as well as mechanical characteristics, such as having about two-thirds of the height, one-half of the floor space, one-half of the weight, and one-third of the volume of conventional transformers of the same voltage and capacity.

A further object of my invention is to provide an electrical apparatus having an insulating liquid and a gas in a hermetically sealed system, with an improved arrangement for maintaining the fluid pressure within the system within a predetermined range during changes in operating conditions.

A still further object of my invention is to provide an improved fluid system for an electric apparatus.

Further objects and advantages of my invention will become apparent from the following description referring to the accompanying drawings, and the features of novelty which characterize my invention will be pointed out with particularity in the claims annexed to and forming a part of this specification.

Figure 5:
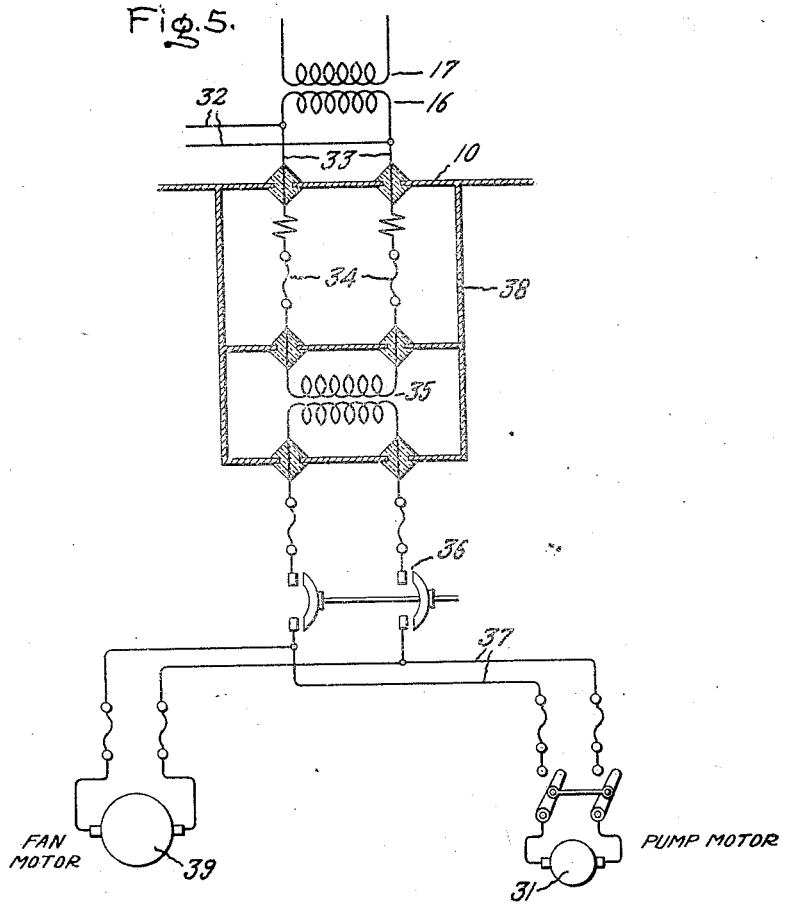
Figure 6:
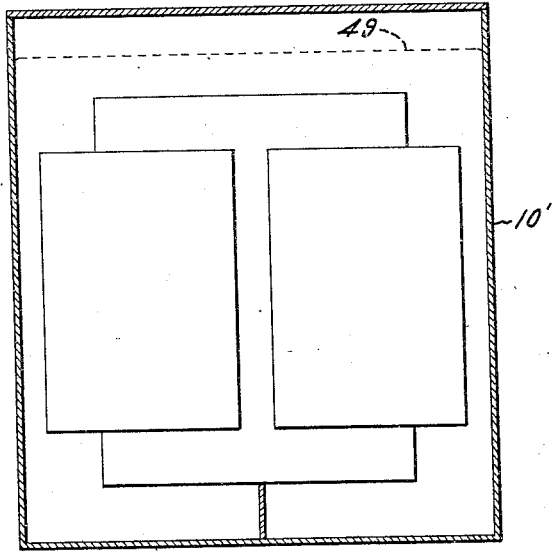
Figure 7:
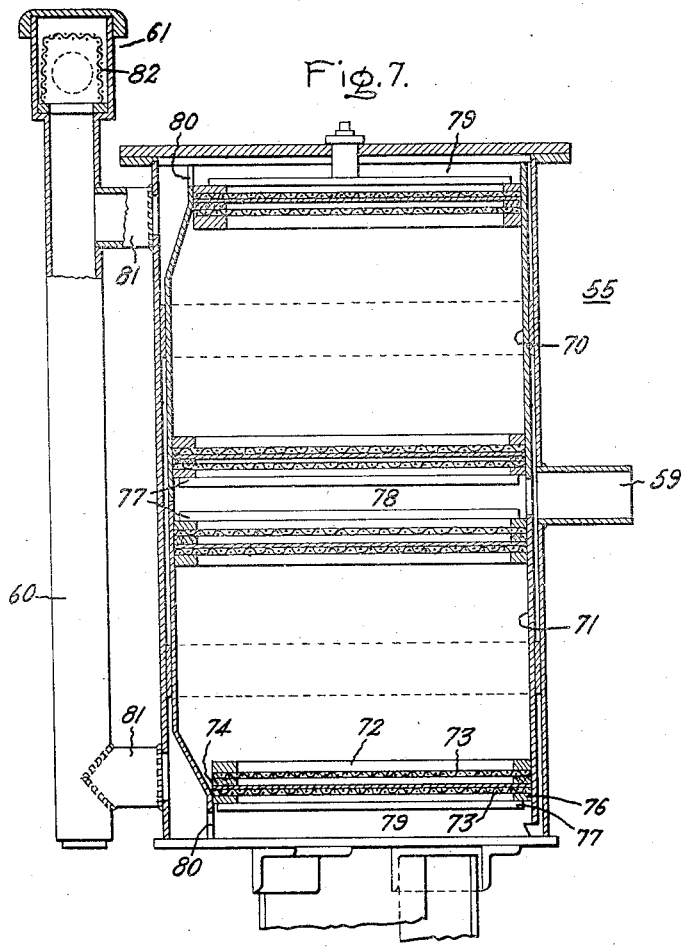
Figure 8:
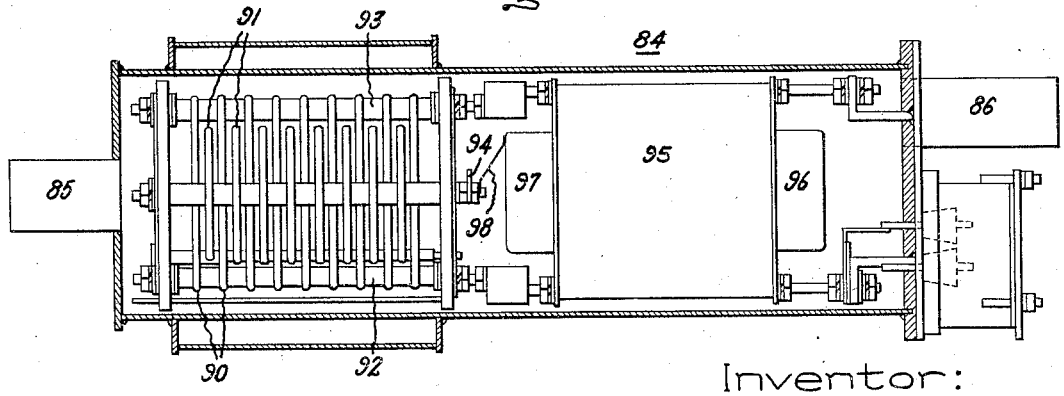
Figure 9:
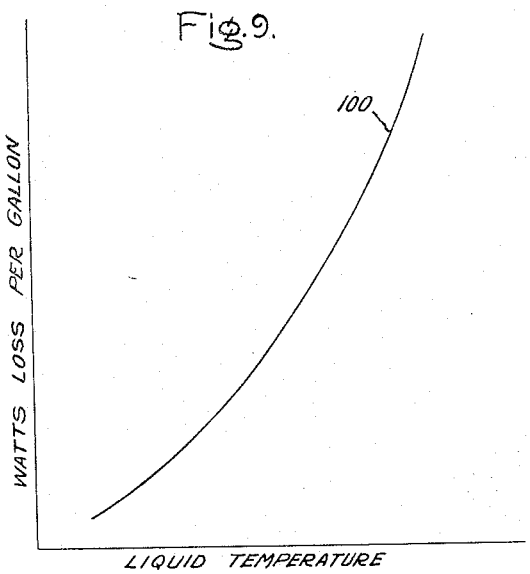
Figure 10:
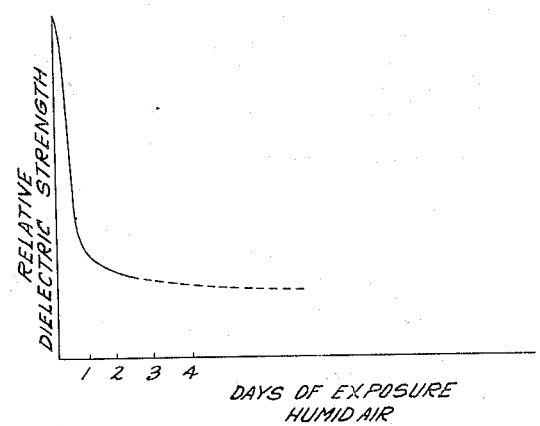
Figure 11:
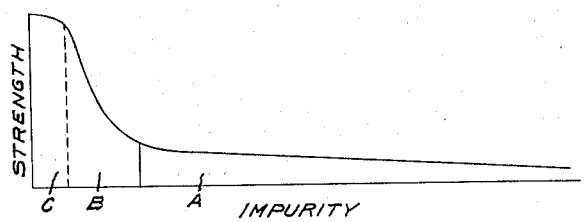
Figure 12:
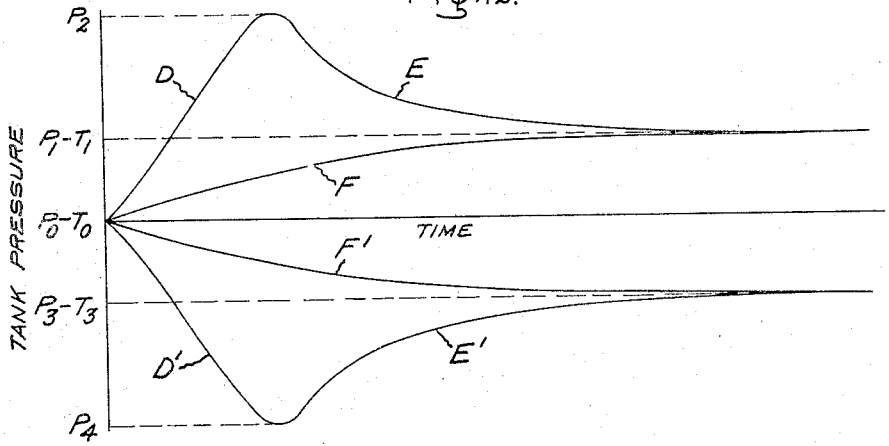
Figure 13:
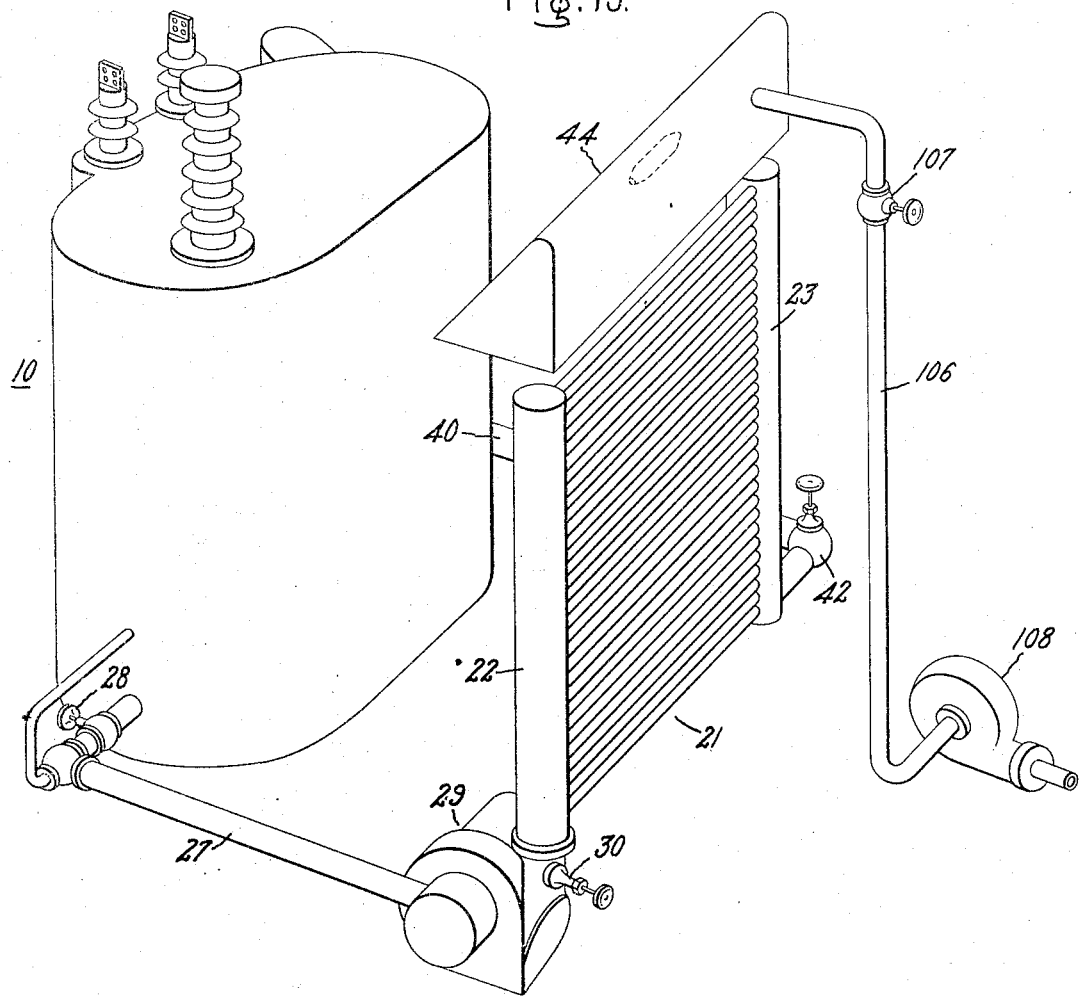
Figure 14:
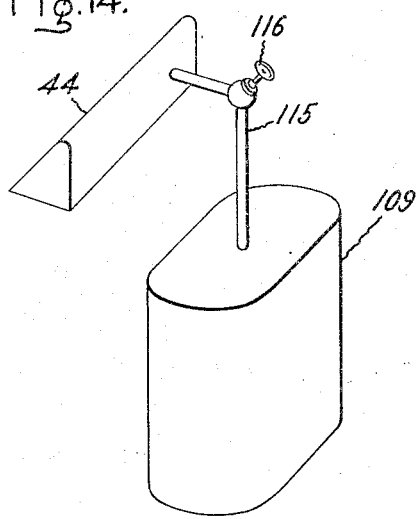

In the drawings Fig. 1 illustrates an exploded perspective view in partial section of a transformer system which is provided with an embodiment of my invention; Figs. 2, 3 and 4 are sectional elevations showing details of parts of the transformer system illustrated in Fig. 1; Fig. 5 diagrammatically illustrates a control circuit for pump and fan motors which may be employed with the system of Fig. 1; Fig. 6 illustrates a modification of a portion of the system of Fig. 1; Fig. 7 is a sectional side elevation of the filter employed in the system of Fig. 1; Fig. 8 is a sectional side elevation of the liquid tester which may be employed in the system of Fig. 1; Fig. 9 is a curve illustrating a purity characteristic which may be determined by the tester of Fig. 8; Figs. 10, 11, and 12 include curves employed in the explanation of my invention, and Figs. 13 and 14 illustrate modifications of the system of Fig. 1.

In the arrangements illustrated in the drawings I have provided an electric apparatus including a transformer structure and fluid system therefor having the various features of my invention, which is designed for relatively high voltage and relatively high kva. capacity. It is, of course, to be understood, however, that my invention has application not only to transformers of the power transformer type, as illustrated in the drawings, but also to any other suitable type of transformer, such as one having a low rated voltage and capacity, or to other electric induction apparatus, or to any other suitable electric apparatus.

The construction illustrated includes a transformer having a substantially hermetically sealed fluid system including a casing or chamber having a core and magnetically associated coils or a relatively high tension element with suitable solid insulation such as cellulosic or porous insulation, and a suitable insulating or dielectric fluid, such as mineral oil or liquid chlorinated hydrocarbons, an example of the latter being described in Patent No. 1,931,373, Clark, patented October 17, 1933, and which is assigned to the same assignee as the present invention. The transformer casing is connected to a suitable heat exchanger and means, such as a pump is provided for continuously circulating the liquid during operation of the transformer through the heat exchanger and back to the casing so that losses may be dissipated. In order to allow for expansion of the liquid a gas cushion is provided including a relatively small tank or gas chamber which is fluidly connected to the transformer casing at its top and which has a portion thereof filled with a suitable gas such as nitrogen.

One feature of my invention is that of employing insulation both solid and fluid, the purity of which is provided and maintained at new levels, which I have found results in economies, such as improved electrical efficiency and in a decrease in size and weight of the resulting apparatus. Thus, this feature of my invention finds a ready application to large power transformers where size in relation to transportation or railroad tolerances is important, but it is to be understood that this feature as well as the others of my invention may also be employed with transformers of any size, or any other suitable electric apparatus.

In order to remove any impurities which may enter the system through leaks or which may be formed during operation of the transformer, a filtering system is provided including any suitable filter through which a portion of the circulating liquid may be passed during operation of the transformer and an aerating and deaerating arrangement for removing impurities, such as gas bubbles. The aerating and deaerating may be accomplished through a spraying arrangement which includes a nozzle or sprayer in the top of the gas chamber which is normally filled with gas, the sprayer being piped to a point where the fluid is continuously circulated so that a portion of the continuously circulated fluid may be atomized. My improved spraying arrangement also facilitates the absorption of gas by the liquid during pressure rises and facilitates the liberation of the absorbed gas during decreasing pressure changes. Thus, my improved spraying arrangement also maintains the fluid pressure within the substantially hermetically sealed system within predetermined limits with a percentage of gas within the casing or gas expansion chamber substantially less than that necessary in prior constructions for similar operating conditions.

Referring more particularly to Fig. 1 of the drawings I have illustrated a transformer structure which includes a casing or tank 10 and a cover 11 which may be attached to the tank in any suitable manner so as to obtain a substantially hermetically or gas tight seal, such as by welding, as is illustrated at 12. It is to be understood that any other conventional sealing means may be employed to provide a substantially closed, or a substantially or reasonably hermetically sealed fluid system. Within the tank I provide a core 13 having winding legs 14 and 15. Surrounding each of the winding legs there is provided a low voltage winding 16 and a high voltage winding 17. Any suitable number of high voltage bushings 18 and low voltage bushings 19 may be provided through which the desired electrical connections may be made with the high voltage and low voltage windings, respectively. In order that the insulating fluid may circulate over the winding surfaces and conduct heat therefrom the windings are provided with ducts 20 of any suitable configuration and construction.

In order to provide an efficient arrangement for cooling the transformer windings so as to have a minimum size per unit of capacity, I provide a heat exchanger or heat dissipating means 21 which may be of any suitable type. Furthermore, since impurities are more readily formed at high temperatures my improved cooling means contributes to the prevention of impurities being formed in the vicinity of the windings by lowering the average temperature of the windings. The heat exchanger includes headers 22 and 23 with a plurality of tubes 24 having a suitable extended surface connected between the headers. One side of the transformer housing 10 is connected to the header 22 through an aperture or port 25 and pipes 26 and 27. A valve 28 is provided in the pipe 26 so that the port 25 may be fluidly isolated from the heat exchanger 21. In order to provide an arrangement for circulating the fluid in the casing 10 out through the aperture 25 and through the pipes 26 and 27, I provide a pump 29 of any suitable construction having its intake end connected with the pipe 27 and its exhaust end connected with the header 22 through a valve 30. The pump may be of any suitable type, and in order to prevent impurities from entering the system through the pump it is desirable that it have a substantially hermetically sealed construction. The pump may be operated through a suitable electric motor and controlled to operate in response to any suitable condition, such as the energization or operation of the transformer.

As will be seen in Fig. 5 a pump motor 31 is connected to be operated from the main transformer low voltage winding 16 which is schematically shown connected to load lines 32. The winding 16 is connected to the pump motor 31 through conductors 33, fuses 34, a distribution or step-down transformer 35, a suitable switch mechanism 36, and conductors 37. The fuses 34 and transformer 35 may be placed within a suitable housing construction 38 which may be attached to the tank 10. Fig. 5 also shows a fan motor 39 adapted to be energized by the transformer 35. This fan motor operates a fan, as shown in Fig. 1, which may be provided for forcing air over the heat exchanger 21.

Referring again to Fig. 1 the header 23 of the heat exchange device 21 may be connected to the transformer casing through a pipe 40 and a port 41 which is at the opposite side of the casing from the port 25. A valve 42 may be provided in the pipe 40 so that the circulation of the fluid through the pipe 40 may be stopped if desired by closing the valve 42. The liquid may circulate through the winding ducts in any suitable manner and in the arrangement illustrated in the drawings a barrier 43 is placed between the bottom of the transformer tank and the bottom of the windings so that the fluid may pass in through the port 41, through the ducts in the windings which surround the winding leg 15, across the top of the transformer, and down through the ducts in the windings surrounding the winding leg 14, as is illustrated by the arrows in Fig. 1. The circulating liquid may then pass out through the port 25 through the pump and into the heat exchanger again. Thus, it will be seen that the liquid may be continuously circulated during operation of the transformer. The barrier to direct the flow of oil is included with the apparatus structure described and claimed in my copending application, S. N. 443,310, filed May 16, 1942, and assigned to the same assignee as this present invention.

In order to provide a gas cushion for the transformer system in order to prevent undesirable pressure changes during changes in temperature of the fluid, I provide a suitable gas cushion in the form of a gas expansion chamber or tank 44 which is connected to the top of the casing 10 at a port 45 through a pipe 46. A pipe 46 connects to the gas expansion chamber 44 at the bottom as will be seen in the detail view of Fig. 4, the pipe 46 being provided with a valve 47. The approximate lower limit of liquid level in the arrangement illustrated in the drawings is indicated by the lower dotted line 48 in the gas expansion chamber and the approximate upper limit by the dotted line 49. With the gas expansion chamber being placed above the cover 11, the transformer structure within the casing 10 will be substantially filled with liquid. Thus the casing 10 and the chamber 44 form a part of the substantially hermetically sealed container means providing a fluid system with a portion thereof filled with liquid and another portion thereof filled with gas, which may be of any suitable type such as nitrogen. Any suitable arrangement may be provided for obtaining a substantially fluid and gas tight seal between the various pipe joints and connections so as to minimize the possibility of impurities entering the closed fluid system. It is to be understood that the gas expansion chamber 44 may be placed in any other suitable position than that shown, or the gas expansion chamber may be a portion of the main casing as is illustrated in Fig. 6. With such a construction the casing 10' will be filled with liquid to any suitable level below the top, such as the level 49, the remaining portion containing gas.

In order to prevent the impurities from entering the transformer in case of a leak, a bomb 51 of any suitable gas, such as nitrogen, which may be supported in any suitable manner on the casing 10, is connected to the top of the gas expansion chamber through a tube 52 so that nitrogen may be added to keep the pressure in the transformer system above any predetermined value, such as atmospheric pressure. A valve 53 is provided in the pipe 52 and a pipe 54 is provided leading from the valve to the top of the headers 22 and 23 of the heat exchanger 21. The valve 53 is a three-way valve and when in one position it disconnects the bomb from the system. When in another position it will connect the nitrogen bomb with the top of the gas expansion chamber 44 and when in the third position it will connect the bomb to the top of the headers 22 and 23 and disconnect it from the top of the gas expansion chamber. The function of this latter connection will be brought out at a later point in the description.

In order to maintain the desired degree of purity of the insulating fluid during the life of the transformer I provide an arrangement which includes a filter 55 of any suitable construction. I have found it to be impracticable to connect the filter in series with the continuously circulating fluid since the power necessary to force all the circulating fluid through an efficient filter is a prohibitively large amount. I therefore connect the filter 55 in parallel with the continuously circulating fluid in any suitable manner, which connecting arrangement includes a pipe 56 which connects with the header 22, and pipes 57, 58 and 59. A pipe 60 connects to the outlets of the filter and an arrangement 61 including a screen is provided to catch any particles which pass through the filter. The screen arrangement is in turn connected through a pipe 61' and a valve 62 to a pipe 63 which runs the substantial height of the casing 10. The pipe 63 connects at one end to the bottom of the casing 10 through a valve 64 and pipe 65 to the top of the casing through a valve 66 and a pipe 67. Thus, the shunted fluid which passes through the filter may be exhausted to either the top or the bottom of the transformer casing 10.

The filter structure 55 which is shown in detail in Fig. 7 includes a pair of tubular or basket members 70 and 71 which are open at both ends. The ends of each of the baskets are provided with an assembly which includes a ring 72 which may be attached to the baskets by any suitable manner, such as by welding. A screen 73 is then held between the ring 72 and a gasket 74 of suitable material, such as cork. A filter of paper is next assembled and a screen similar to the screen 73 placed below the filter paper. This assembly is then held against the ring 72 by means of a ring 76 and a strap 77. The space between the inner screens 73 at the ends of the baskets may be filled with any suitable material, such as fuller's earth. The fluid will then pass into the filter structure through the pipe 59 to a central chamber 78. Half of the fluid will pass through the basket 70 and the other half through the basket 71. The liquid will then be discharged into chambers 79 at the end of the baskets which connect through ports 80 to outgoing pipes 81. The pipes 81 are in turn connected to the pipe 60. In order to catch any remaining floating contaminants or particles of fuller's earth, the screen arrangement 61 is provided including a screen 82.

The fluid may be circulated through the filter continuously during operation of the transformer system or may be passed therethrough only when it is necessary to improve the purity of the fluid by removing impurities. In order to determine the degree of purity of the fluid at regular intervals a suitable testing arrangement 84 may be provided which may be connected in series with the filter through pipes 85 and 86. Valves 87 and 88 are provided in the pipes 85 and 86, respectively, so that the tester may be disconnected if desired from the fluid system. A valve 89 is also provided between the pipes 57 and 58 which valve may be opened when the tester is disconnected from the circuit and which may be closed when it is desired to have the fluid pass through the tester. The fluid tester may be of any suitable construction and as illustrated in Fig. 8 includes a plurality of condenser plates or electrodes 90 and 91. The electrodes 90 are electrically connected to conductor bars 92 and 93 and the electrodes 91 are connected to a conductor bar 94. A transformer 95 is also provided with its low voltage side 96 connected to any suitable source of supply. The high voltage side 97 may then have one side grounded and the other side connected through the conductor 98 to the conductor bar 94. The outer conductor bars 92 and 93 may then be connected to a suitable bridge circuit for determining the conductivity of the fluid which is an indication of its degree of purity. The amount of current flowing through the insulating fluid may be determined in any suitable manner such as by measuring the vector in phase with the voltage by a suitable phase sensitive detector. This reading may then give the watts loss per gallon of the fluid and the reading compared with the permissible value of conductivity which may be determined from Fig. 9, which shows a curve 100 with conductivity or watts loss per gallon plotted as ordinate and temperature plotted as abscissa. Thus, if the reading is above the curve in Fig. 9 the filter may be started by opening the suitable valves while if the reading is below it will be given indication that the desired degree of purity obtains in the fluid.

As has been stated above, since I have provided a transformer structure for substantially maintaining the degree of purity which obtains at the factory throughout the life of the transformer, I may employ insulation having a degree of purity heretofore not known or attempted. Furthermore, by the utilization of a suitably or relatively purified or superpurified insulation, both solid and liquid, it further becomes possible to make reductions in insulation distances currently considered necessary for the reliable operation of such apparatus at a given high potential. Such reduction in insulation distances save not only solid insulating material but also copper in the windings, high grade iron in the core, container size, fluid filler, and labor in connection with them. Thus, by the employment of a superpure insulation, I contribute to the result of decreasing the size of the apparatus or device.

To illustrate the significance of a superpurified insulation let us consider the following: According to the standard specifications of A. S. A. (American Standards Association) the dielectric strength of transformer oil is good if it tests 22 kv. between two 1 inch metal disks set $\frac{1}{10}$ of an inch apart; yet by suitable purification, this value may be doubled. These specifications do not distinguish between various qualities of insulation oils above the present standard level, not because there are not different qualities but primarily because this level of dielectric strength can be secured and maintained without undue difficulties, while lower levels have been considered unnecessarily unrealiable in operation, and very much higher levels have been considered impracticably unreliable in maintenance and therefore of no particular advantage in commercial apparatus.

The dielectric strength of the highest grade insulating oils and other liquid insulation such as the chlorinated hydrocarbons, as well as any other solid insulation, is extremely sensitive to small impurities, such as gas bubbles, lint, and especially to small amounts of moisture content capable of absorption from the external air; it is sensitive to acid-forming and other by-products that may be generated within the insulation itself due to the action of the heat of the apparatus, especially in the presence of certain catalytic bodies and small amounts of moisture; and it is sensitive also to contaminations that may be exchanged between the solid and the liquid insulations in intimate contact with each other in the apparatus. The higher the level of the dielectric strength of the insulation oil, the more minute are the impurities that will spoil it. This is illustrated by the graph of Fig. 10 which exhibits the relative dielectric strength of an oil-soaked paper insulation (typical of transformer insulation), when exposed to humid air as verified in a laboratory investigation. The paper was first dried in a vacuum, then soaked in highly purified oil in a vacuum, then exposed to damp air, and samples where tested at various intervals of time while so exposed. It will be gathered from this graph that at the end of the first day the dielectric strength of this insulation fell very rapidly to less than one-third of its initial value and the second day to one-quarter, the later day showing a slower rate of deterioration. It is evident that oil-immersed cellulosic insulation that has at all a chance of moisture absorption in the course of time can not be designed to operate at dielectric stresses corresponding to its super-dry condition.

A superpure insulation for the purposes of the present invention is one which has substantially the dielectric strength that it would have if the deleterious impurities which are actively contaminating it were entirely removed. In practice this quality is substantially attained without the necessity of removing every last trace of these impurities. I have illustrated by a graph of Fig. 11, a curve in which impurity of the insulation or dielectric is plotted as abscissa, and strength or dielectric strength is plotted as ordinate. It will be seen that the curve has three distinct zones: A is a zone of low dielectric strength, and has as small slope, meaning that dielectric strength improves slowly with increased purity; B is a zone of intermediate strength and is characterized with a steep slope; i. e., strength improves very rapidly with purity; and C is a zone with maximum strength but with a low slope, that is, purification in this zone results in relatively little improvement. Zone C is the zone of superpurity which it is desirable to maintain in a transformer manufactured according to the structure described.

In order to minimize the possibility of gas bubble formation in the transformer tank and also to maintain the pressure in the fluid system within a predetermined range during maximum temperature changes, with a minimum volume of gas in the gas expansion chamber, I provide an improved arrangement for aerating and deaerating a portion of the continuously circulated fluid during operation of the transformer.

For any given liquid associated with any given gas there is a definite amount of gas which will be in a state of absorption in the liquid under any given steady state condition of temperature and pressure. Thus, when all the gas which the liquid is capable of absorbing for any steady state conditions of temperature and pressure is absorbed by the liquid, then it may be said that the dissolved gas is in substantial equilibrium with the free gas. However, under transient conditions of pressure and temperature the amount of dissolved gas will be considerably out of equilibrium with the free gas unless the change in pressure and temperature takes place at a very slow rate. However, electrical apparatus, such as transformers, are susceptible to relatively rapid changes in temperature due to rapid changes in ambient temperature or rapid changes in load. In further explanation of this phenomenon reference may be had to Fig. 12 where time is plotted as abscissa and pressure as ordinates. Let us assume that any given pressure $P_0$ and temperature $T_0$ is a base line and that there is a rise in temperature to the value $T_1$, which corresponds with a pressure $P_1$. Let us assume also that the change occurs at a rate faster than that rate in which the equilibrium may be maintained with the mere adjacent relationship in a container of a given amount of liquid with a given amount of gas, which faster rate may be thus considered a relatively rapid rate of change. This will cause the pressure to rise along some curve, such as D up to some value $P_2$, depending on the characteristics of the gas and liquid and the rate of rise of temperature, at which point the gas will be absorbed into the liquid at a sufficient rate so as to prevent further increases in pressure. The pressure will then decrease along some curve, such as E until a steady state condition is reached corresponding to $P_1$. However, by maintaining the amount of dissolved gas in substantial equilibrium with the free gas during the transient, a pressure rise such as that along the curve F may be obtained. It will be seen that this pressure rise does not rise above the final steady state condition $P_1$. For a decrease in temperature to $T_3$, with a corresponding steady state pressure of $P_3$, the pressure will lower to a value $P_4$ along the curve D' and then will increase along a curve E' until the pressure $P_3$ corresponding to the temperature $T_2$ obtains. Also by maintaining the equilibrium conditions during this transient stage, the pressure will vary along a curve, such as F'.

In order therefore to substantially maintain the pressure changes during any given transient within the limits of the steady state pressures for any given or expected operating conditions, I greatly increase the area of the contact surface between the gas and liquid as compared with that obtaining at the top of the liquid level within a container of a practical configuration, such as that of the casing or gas chamber. Thus I provide an improved arrangement for facilitating the absorption of gas into the liquid during rises in temperature and for facilitating the liberation of the absorbed gas during decreases in temperature. In this manner, the dissolved gas content of the liquid is rapidly brought substantially into equilibrium with the gas under varying conditions of temperature and pressure within the fluid system. The arrangement as illustrated in Fig. 2 includes a sprayer which has a tube 101 with nozzles 102 and 103 so that when the liquid is forced through the nozzles it is atomized. A pipe 104 connects with the tube 101, the pipe in turn connecting through the pipe 56 to the header 22 near the exhaust end of the pump 29. A valve 105 may be placed in the pipe 104 for fluidly disconnecting the sprayer from the header if desired. Any other suitable spray arrangement may be of course provided. It will also be seen that I have provided an arrangement for connecting a spraying device in parallel with a portion of the fluid system, through which the liquid is being continuously circulated. By maintaining the operating pressure range within suitable limits, this structure contributes to the results of a minimum size per unit volume and maintenance of purity. Thus a minimum volume of gas need be employed, and the possibility of leaks at all joints is reduced to a minimum by maintaining the stress at the joints to a minimum value.

Operation of my improved arrangement for maintaining the absorbed and free portions of the gas in substantial equilibrium will be apparent from the following: Let us assume that the transformer structure is operating under normal conditions with a temperature rise of approximately a predetermined value of degrees of the fluid within the system within a predetermined time, so that the increase may be considered relatively rapid. This causes both the liquid and the gas inside the enclosed system to expand. Since a portion of the continuously circulated liquid is being sprayed through the nozzles 102 and 103, when the pressure inside the enclosed system increases, a larger quantity of gas will be absorbed into the liquid than that which was present before the rapid increase in temperature and thus there is maintained a substantial equilibrium during the transient conditions, or the pressure will not rise substantially above the steady state value corresponding with the temperature rise. In this manner, the gas will be continuously absorbed by the liquid until a steady state condition exists, or until a maximum pressure is obtained which we may consider the high value of a predetermined pressure range for a given temperature. Let us now consider that there is a rapid decrease in temperature such as by a rapid falling ambient temperature or by a sudden decrease in power output of the transformer. This will cause the pressure inside the enclosed casing to fall and thus the liquid which is continuously sprayed from the atomizer 101 will liberate some of its absorbed gas to maintain substantial equilibrium which will tend to increase the pressure within the enclosed casing and thereby prevent the pressure within the casing from dropping below a certain minimum value which will be the lower value of an operating range during such transient conditions. Furthermore, this will substantially prevent the formation of bubbles, or will remove any from the stressed portion of the liquid which may be formed under severe transients. Absorbed gas as distinguished from bubbles is not a deleterious impurity.

In case of failure of the electrical apparatus which may cause a discharge within the apparatus, hydrogen chloride gas will be formed when an insulating fluid such as a hydrocarbon is employed. In the presence of moisture which may be liberated from the insulation due to the arc, hydrochloric acid is formed which decomposes the insulation and seriously corrodes metal parts of the transformer within a relatively short time. If such a condition should happen the valves 30, 42, 87, and 89 may be closed, thus causing all the pumped fluid to circulate through the sprayer. As is illustrated in Fig. 13, a pipe 106 with a valve 107 may be connected to the gas expansion chamber 44 so that the hydrogen chloride gas which is liberated by the spraying may be pumped out through a pump 108. This may be accomplished in a relatively few minutes and the transformer then placed back in operation unless the failure was of such a severe condition as to cause a permanent short circuit in the transformer windings. Instead of providing a pump 108, an arrangement 109, as is illustrated in the fragmentary view of Fig. 14, may be provided which arrangement is filled with a chemical which will absorb the hydrogen chloride gas. This may be connected to the chamber 44 through a pipe 115 and a valve 116 which may be opened to allow the gas to pass into the gas absorber 109. An arrangement for spraying the liquid dielectric in a gas portion of the closed system to liberate impurities such as moisture and providing means for drying the sprayed gas is described and claimed in a copending application, S. N. 420,941, Race, filed concurrently with my application and which is assigned to the same assignee as this present invention. The Race application in addition describes and claims structure for removing the sprayed gas with the moisture and replenishing the gas from another gas supply.

In order to facilitate the removal of the gas from the tank 10 if there is a relatively rapid evolution thereof caused by an electrical breakdown of the device in the tank 10, pipes 110 of much larger cross section than the pipe 46 may be provided which pipes extend into the gas expansion chamber from the tank through which the gas may pass.

In the event that it becomes necessary to remove the cooler 21 and a storage capacity is not available to store the liquid which must be drained from the cooler before it can be removed, the insulating liquid in the cooler may be displaced therefrom by the fluid system illustrated in Fig. 1. This may be done by first setting the three-way valve 53 so that gas from the bomb 51 will pass through the pipes 52 and 54 and enter the top of the headers 22 and 23. Assuming that the pressure of the gas is greater than the head of liquid to the top level in the gas expansion chamber, the gas will force the fluid out through the pipes 27 and 40 and through the pipes 46 and 110 into the space in the gas expansion chamber which is normally filled with gas. A substantially fluid tight vent 111 may be placed at the top of the gas expansion chamber, which vent may be opened to allow the gas to escape. When the liquid is expelled down to the bottom of the headers 22 and 23 the valves 42 and 28 may be closed. It will be seen in Fig. 1 that the bottom of the pump is connected to the bottom of the transformer casing 10 through a pipe 112 which has a valve 113 therein. By closing the valves 28 and 42 the liquid remaining in the pump 29 may be forced out through the pipe 112. When it is all forced out the valve 113 may be closed. The cooler with or without the pump may then be removed from the system and repaired. The volumetric capacity of the gas expansion chamber above the normal liquid level 48 is sufficient to accommodate the liquid in the cooler and associated pipes. In case it is desired to remove the cover 11 from the transformer tank 10, gas from the bomb 50 may be admitted to the top of the headers 22 and 23 and the liquid forced out from the bottom thus displacing it into the gas expansion chamber and substantially filling it. The valve 47 in the pipe 46 may then be closed and the three-way valve 53 shut off and the liquid in the transformer tank will pass into the coolers until it is substantially filled. Substantially fluid tight vents 114 may be placed at the top of the headers 22 and 23 which may be opened to allow the gas in the cooler to escape so that the liquid will flow into the cooler. This will cause the liquid level to lower a sufficient amount below the top of the casing 10 so that the cover may be removed by cutting the weld 12 without loosing any of the liquid inside the transformer tank 10.

In view of the foregoing considerations, it will be seen that I have provided improved structure in electrical apparatus for employing insulation, the quality and efficiency thereof being at levels heretofore considered impracticable, and for maintaining this degree of purity, or any other suitable degree of purity, and for providing an improved electric apparatus which will be efficient in operation and have a minimum size per unit of capacity, and I have also outlined certain of the more important advantages or results which obtain with a high level of purity and a minimum of size and weight of the apparatus construction. Furthermore, although the various features of my invention when employed with a suitable electric apparatus mutually contribute to produce the same important results and advantages, it is also to be understood that various features of my invention may be employed in a suitable apparatus without the employment of all the other features of my invention. For example, my improved arrangement for maintaining substantial equilibrium between the gas and the dissolved gas in a liquid and for maintaining the pressure changes within predetermined limits may be employed in a suitable electric apparatus without the employment of such features of my invention, as the forced cooling arrangement or the high degree of purity feature of the insulation.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. In an electric apparatus, a fluid system, a coil winding within said fluid system, a liquid dielectric filling a portion of said fluid system, a gas filling a portion of said fluid system, said fluid system being substantially hermetically sealed so as to prevent the entrance of impurities into said fluid system, and means for maintaining the pressure within said fluid system within a predetermined range during relatively rapid temperature changes including means for maintaining the amount of gas in the state of absorption in said liquid in substantial equilibrium with said gas during transient pressure conditions.

2. In an electric apparatus, a fluid system, a coil winding within said fluid system, a liquid dielectric filling a portion of said fluid system, a gas filling a portion of said fluid system, said fluid system being substantially hermetically sealed so as to substantially prevent the entrance of impurities into said fluid system, and means for maintaining the pressure within said fluid system within a predetermined range during temperature changes including means for facilitating the absorption of said gas by said liquid during increasing pressure changes and for facilitating the liberation of said absorbed gas from said liquid during decreasing pressure changes.

3. An electric apparatus including a substantially closed fluid system, a coil winding within said closed system and having solid insulation, a liquid dielectric filling a portion of said closed system and surrounding said insulated winding, a gas filling a portion of said closed fluid system, said closed fluid system being substantially hermetically sealed so that the degree of purity of said insulation and dielectric obtaining when said apparatus is manufactured may be substantially maintained, and means for maintaining the pressure within said closed system within predetermined steady state limits during relatively rapid temperature changes between said limits including means for varying the amount of gas in the state of absorption in said liquid dielectric directly with changes in pressure within said closed system.

4. An electric apparatus including a fluid holding system having a casing, a coil winding within said casing having solid insulation, a liquid dielectric filling a portion of said casing and surrounding said insulated winding, a gas filling the remainder of said casing, said casing being substantially hermetically sealed so that impurities may be kept out of said casing and the degree of purity of said solid insulation and said liquid dielectric obtaining when said apparatus is manufactured may be substantially maintained during the expected life of said apparatus, and means for varying the ratio of free gas in said casing with the amount absorbed by said liquid during relatively rapid temperature changes so as to maintain the pressure within said casing substantially within a pressure limit corresponding to the final temperature value under steady state conditions.

5. In an electric apparatus, a fluid system, a coil winding within said fluid system, a liquid dielectric filling a portion of said fluid system, a gas filling a portion of said fluid system, said fluid system being substantially hermetically sealed so as to substantially prevent the entrance of impurities into said fluid system, and means for maintaining the pressure within said fluid system within a predetermined range during temperature changes including spray means, and means for passing said liquid dielectric through said spray means in contact with said gas for facilitating the absorption of said gas by said liquid dielectric during increasing pressure changes and for facilitating the liberation of said absorbed gas from said liquid dielectric during decreasing pressure changes.

6. An electric apparatus including a fluid system, a coil winding within said fluid system, a liquid dielectric filling a portion of said fluid system, a gas filling a portion of said fluid system, said fluid system being substantially hermetically sealed so as to substantially prevent the entrance of impurities into said fluid system, and liquid atomizing means in said portion of said fluid system which is normally filled by said gas, and means for passing said liquid dielectric through said atomizing means in contact with said gas so as to control the amount of gas in the state of absorption in said liquid dielectric and thereby maintain the pressure within said closed system within a predetermined range.

7. An electric apparatus including a fluid system, a coil winding within said fluid system, a liquid dielectric filling a portion of said fluid system, a gas filling a portion of said fluid system, said fluid system being substantially hermetically sealed so as to substantially prevent the entrance of impurities into said fluid system, liquid atomizing means in said portion of said fluid system which is normally filled by said gas, and means for continuously circulating a portion of said liquid dielectric through said atomizing means in contact with said gas during operation of said apparatus so as to facilitate the absorption of said gas by said liquid dielectric during rising temperature changes and to facilitate the liberation of said absorbed gas from said liquid dielectric during falling temperature changes.

8. An electric apparatus including a closed fluid system, a coil winding within said fluid system, a liquid dielectric filling a portion of said fluid system, a gas filling a portion of said fluid system, said fluid system being substantially hermetically sealed so as to substantially prevent the entrance of impurities into said fluid system, means for continuously circulating said liquid dielectric through said closed fluid system during operation of said apparatus, and means for continuously spraying a portion of said circulating liquid dielectric in that portion of said system normally filled by said gas so as to facilitate absorption of said gas by said liquid dielectric during rising temperature changes and to facilitate liberation of said gas from said liquid dielectric during lowering temperature changes in order to maintain the pressure within said fluid system within a predetermined range.

9. An electric apparatus including a closed fluid system, a coil winding within said fluid system having solid porous insulation, a liquid within said closed system and surrounding said coil windings, said insulation and liquid being in a state of purity at the time of manufacture, said closed fluid system being substantially hermetically sealed so as to prevent the entrance of impurities into said system and thereby contributing to maintaining the state of purity during the expected life of said apparatus, means for continuously circulating said liquid through said closed system during operation of said apparatus so as to facilitate the removal of heta and impurities from the vicinity of said winding, means for continuously spraying a portion of said circulating liquid in that portion of said system normally being filled by said gas so as to substantially prevent the formation of gas bubbles in said liquid, and means for continuously filtering a portion of said continuously circulating liquid so as to remove any impurities formed during operation of said apparatus.

10. An electric apparatus including a fluid system, a casing, a coil winding within said casing, a liquid dielectric within said casing, a gas expansion tank, means for connecting said tank to the top of said casing, a gas filling a portion of said tank, a heat exchanger, means for connecting said heat exchanger fluidly in series with said casing, pump means for continuously circulating said liquid dielectric from said casing through said exchanger and back to said casing during the operation of said apparatus so as to remove heat and impurities formed during operation of said apparatus from the vicinity of said winding, said casing, exchanger, pump, tank and connecting means forming said fluid system and being substantially hermetically sealed so as to prevent impurities from entering said fluid system, a filter, means for connecting said filter in parallel with said casing and exchanger so that a portion of said circulating liquid dielectric may be continuously filtered during operation of said apparatus, and means for spraying a portion of said continuously circulating liquid dielectric in said tank so as to substantially prevent the formation of gas bubbles in said liquid dielectric in the vicinity of said winding.

11. An electric apparatus including a casing, a coil winding within said casing, a liquid dielectric within said casing, a gas expansion chamber, means for connecting said chamber to the top of said casing, a gas filling a portion of said chamber, a heat exchanger, means for connecting said heat exchanger fluidly in series with said casing, pump means for continuously circulating liquid dielectric from said casing through said exchanger and back to said casing during the operation of said apparatus so as to remove heat and impurities formed during operation of said apparatus from the vicinity of said winding, said casing, exchanger, pump, chamber, and connecting means forming a fluid system and being substantially hermetically sealed so as to prevent impurities from entering said fluid system, a filter, means for connecting said filter in parallel with said casing and exchanger so that a portion of said circulating liquid dielectric may be continuously filtered during operation of said apparatus, a sprayer within said chamber, means for connecting said sprayer in parallel fluidly with said casing and exchanger so that a portion of said circulating liquid dielectric will be atomized within said chamber and thereby minimize the possibility of formation of gas bubbles in the liquid and maintain the pressure within said fluid system within a predetermined range.

12. A high-tension high-power electrical system comprising a substantially hermetically sealed container means providing a closed fluid system, a relatively pure insulating liquid in said container means, a gas in said container means, a high-tension element immersed in said liquid, and purifying means adapted to substantially maintain the purity of said liquid including filtering means and means for substantially preventing the formation of gas bubbles in the stressed portion of said liquid or for removing gas bubbles formed during operation of said electrical system.

13. A high-tension high-power electrical system comprising a substantially hermetically sealed casing, a superpure insulating liquid in said casing, a gas in said casing, a high-tension element immersed in said liquid, purifying means adapted to substantially maintain said purity of said liquid including filtering means and means for substantially preventing the formation of gas bubbles in the stressed portion of said liquid or for removing gas bubbles formed during operation of said electrical system, heat-dissipating means, and means including a substantially hermetically sealed pump for fluidly connecting said casing and heat-dissipating means for circulating liquid through said purifying means and said heat-dissipating means.

14. High-tension high-power electrical apparatus comprising a substantially hermetically sealed container means providing an enclosed fluid system, an insulating liquid in said container means, a high tension element having fibrous insulation and immersed in said liquid, a gas space at least partially above said liquid and containing a gas, means to cause continuous circulation of said liquid while said high-tension element is energized, means within said container means to filter said liquid continuously, and means to bring the dissolved gas content of said liquid rapidly into equilibrium with said gas under varying conditions of temperature and pressure.

15. An electric apparatus including a casing, core and coils in said casing, heat exchanger means fluidly connected with said casing, a gas expansion chamber fluidly connected with said casing, a liquid filling said casing and heat exchanger and a portion of said gas expansion chamber, means for displacing said liquid in said heat exchanger through said casing and into said gas expansion chamber, and means for fluidly isolating said heat exchanger means from said casing.

16. In an electric apparatus, a casing having core and coils, a gas expansion chamber fluidly connected to said casing, a heat exchanger fluidly connected to said casing, a liquid filling said casing and heat exchanger and a portion of said gas expansion chamber, means for displacing the fluid in said heat exchanger means into said gas expansion chamber, and means for allowing liquid in said casing to substantially fill said heat exchanger means so as to lower the level of the liquid in said casing.

17. In an electric apparatus, a fluid system, an insulating liquid in a first portion of said fluid system, a gas in a second portion of said fluid system, said fluid system being substantially fluid tight, spray means in said second portion of said fluid system having the gas, and means for passing liquid from said first portion through said spray means so that atomized fluid will be in contact with gas.

KONSTANTIN K. PALUEV.